J. E. CARTER.
CENTER GAGE.
APPLICATION FILED JUNE 29, 1915.
1,166,968.
Patented Jan. 4, 1916.
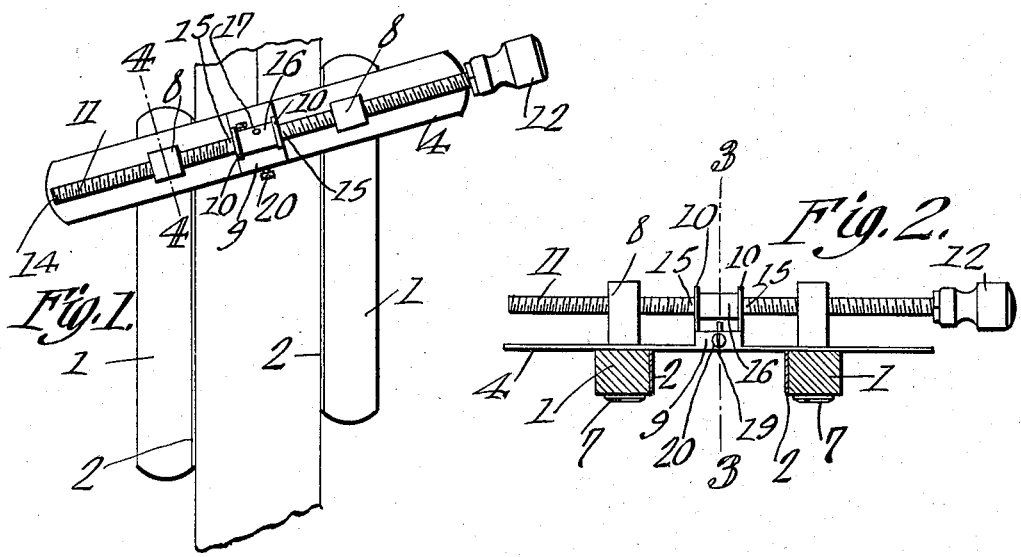
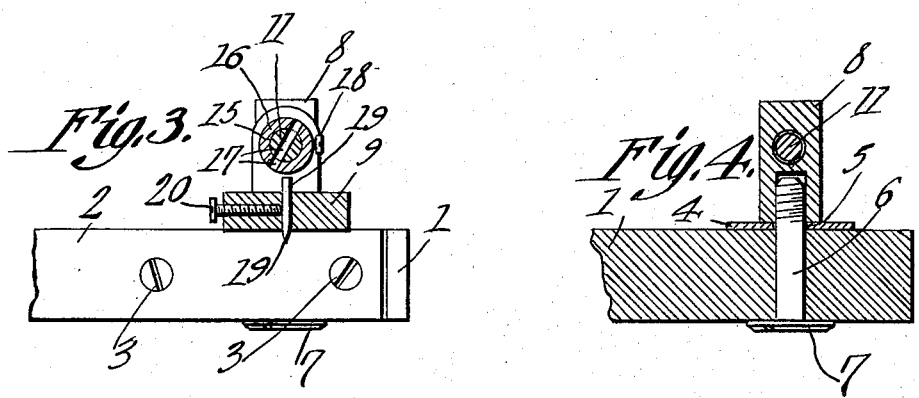
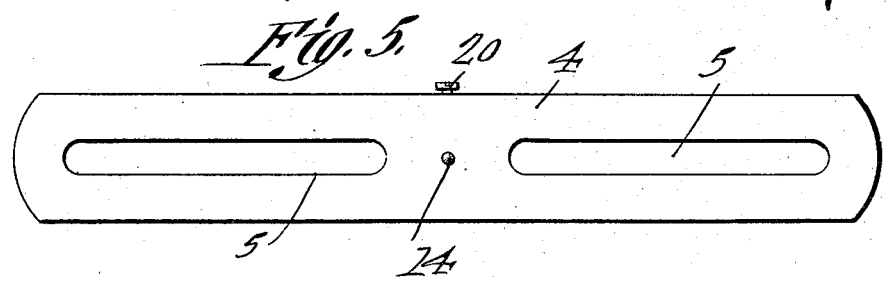
Witnesses
J. E. Carter
Inventor
by C. A. Snow & Co.
Attorneys

UNITED STATES PATENT OFFICE.

JAMES E. CARTER, OF MORROW, LOUISIANA.

CENTER-GAGE.

1,166,968.    Specification of Letters Patent.    Patented Jan. 4, 1916.

Application filed June 29, 1915. Serial No. 37,020.

*To all whom it may concern:*

Be it known that I, JAMES E. CARTER, a citizen of the United States, residing at Morrow, in the parish of St. Landry and State of Louisiana, have invented a new and useful Center-Gage, of which the following is a specification.

The device forming the subject matter of this application is adapted to be employed for inscribing a center point upon a stick of timber or other object.

The invention aims to provide novel means whereby, through the coöperation of a pair of pivotally connected, opposed members, the center point may be located readily.

Another object of the invention is to provide a device of this sort which is adjustable to operate upon sticks of timber or other objects of different widths.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows the invention in top plan and in working position; Fig. 2 is a transverse section of the device, removed from the object upon which it is adapted to operate, the parts of the structure being shifted slightly, from the positions shown in Fig. 1; Fig 3 is a transverse section taken approximately on the line 3—3 of Fig. 2; Fig. 4 is a fragmental section taken approximately on the line 4—4 of Fig. 1; Fig. 5 is a bottom plan of the connecting member.

In carrying out the present invention there is provided a pair of opposed members 1 which, if fashioned from wood, may be provided upon their inner surfaces with metal facing strips 2 held in place by means of securing elements 3. The invention comprises a connection 4 ordinarily in the form of a strip of metal, provided adjacent its ends with elongated slots 5. Pivot elements unite the opposed members 1 with the connection 4, these elements including screws 6 extended upwardly through the opposed members 1 near to the ends thereof, and journaled in the opposed members. The screws 6 are provided with heads 7 engaging the under faces of the opposed members 1, the screws passing through the slots 5 in the connection 4, and the upper ends of the screws being threaded into posts 8, superposed upon the connection 4, the posts 8 being wide enough so as to overlap the slots 5 slightly.

Intermediate its ends, the connection 4 is provided with a lug 9 having upstanding ears 10. Passing through the ears 10 and journaled therein is a screw 11 which is threaded in opposite directions through the posts 8. That portion of the screw 11 which passes through the ears 10 is devoid of threads, as shown at 15. Surrounding the unthreaded portion 15 of the screw 11 and lying between the ears 10 is a tubular abutment 16, the ends of which coact with the ears 10 to prevent the screw from moving endwise when the same is rotated. The abutment 16 may be held in place by means of a set screw 18. Any desired means may be provided for rotating the screw, the screw being provided with a head 12 at one end or a kerf 14 at the other end. If desired, the abutment 16 and the portion 15 of the screw 7 may be equipped with registering openings 17, adapted to receive a nail or the like, whereby the screw may be rotated.

Mounted in the lug 9 of the connection 4 for vertical adjustment is a scriber 19 which may be held in place by means of a set screw 20 or in any other desired manner.

In practical operation, the opposed side members 1 of the gage are separated, by a proper manipulation of the screw 11, until the side members are spaced by a distance slightly greater than the width of the piece of material which is to be centered. Then, the side members 1 are moved longitudinally with respect to each other until, as shown in Fig. 1, they bear upon the opposite edges of the material. Under such circumstances, the scriber 19 will, when the structure is moved longitudinally of the material leave a mark which is midway between the edges of the material.

As hereinbefore indicated, the opposed side members 1 may be moved toward and away from each other for adjustment, by manipulating the screw 11.

Having thus described the invention, what is claimed is:—

1. In a device of the class described, a connection; a pair of opposed members each pivoted at a single point to the connection; and a scriber mounted on the connection and located between the said opposed members.

2. In a device of the class described, a connection; a pair of pivot elements mounted to move longitudinally of the connection; means for operatively connecting the pivot elements to move the same longitudinally of the connection; a pair of opposed members mounted on the pivot elements; and a scriber carried by the connection and located between the said opposed members.

3. In a device of the class described, a connection; a pair of pivot elements mounted to move longitudinally of the connection; a scriber carried by the connection; a pair of opposed members mounted on the pivot elements and disposed upon opposite sides of the scriber; a screw threaded in opposite directions into the pivot elements; an abutment on the screw; and means carried by the connection for holding the abutment against movement longitudinally of the connection.

In testimony that I claim the foregoing as my own, I have hereto affixed my signature in the presence of two witnesses.

JAMES E. CARTER.

Witnesses:
 H. E. LOWREY,
 E. L. MORROW.

Copies of this patent may be obtained for five cents each, by addressing the "Commissioner of Patents, Washington, D. C."